(12) United States Patent
Muto (10) Patent No.: US 9,169,826 B2
(45) Date of Patent: Oct. 27, 2015

(54) LIGHTNING PROTECTION STRUCTURE OF BLADE FOR WIND POWER GENERATION

(75) Inventor: Atsutoshi Muto, Muroran (JP)

(73) Assignee: THE JAPAN STEEL WORKS LTD., Tokyo (JP)

( * ) Notice: Subject to any disclaimer, the term of this patent is extended or adjusted under 35 U.S.C. 154(b) by 625 days.

(21) Appl. No.: 13/576,983

(22) PCT Filed: Feb. 3, 2011

(86) PCT No.: PCT/JP2011/052299
§ 371 (c)(1),
(2), (4) Date: Aug. 3, 2012

(87) PCT Pub. No.: WO2011/096500
PCT Pub. Date: Aug. 11, 2011

(65) Prior Publication Data
US 2012/0301300 A1 Nov. 29, 2012

(30) Foreign Application Priority Data
Feb. 4, 2010 (JP) ................................. 2010-023504

(51) Int. Cl.
*F03D 11/00* (2006.01)
*F03D 1/06* (2006.01)
*H02G 13/00* (2006.01)

(52) U.S. Cl.
CPC .......... *F03D 1/0675* (2013.01); *F03D 11/0033* (2013.01); *H02G 13/00* (2013.01); *H02G 13/80* (2013.01); *F05B 2280/2004* (2013.01); *F05B 2280/5002* (2013.01); *Y02E 10/721* (2013.01); *Y02E 10/722* (2013.01)

(58) Field of Classification Search
CPC .... F03D 11/0033; F03D 1/0675; H02G 13/00
USPC .......................................................... 416/39
See application file for complete search history.

(56) References Cited

U.S. PATENT DOCUMENTS

| | | | | |
|---|---|---|---|---|
| 5,365,398 A | * | 11/1994 | Briet | ............................. 361/117 |
| 5,998,731 A | | 12/1999 | Takamura | |
| 8,105,035 B2 | * | 1/2012 | Bertelsen | .................. 416/146 R |
| 8,430,631 B2 | * | 4/2013 | Olsen | ................................ 416/1 |
| 2004/0028528 A1 | | 2/2004 | Flemming | |
| 2005/0175457 A1 | * | 8/2005 | Yoshida | ........................ 416/142 |
| 2008/0193292 A1 | | 8/2008 | Stam et al. | |
| 2009/0056968 A1 | * | 3/2009 | Bertelsen | ........................... 174/2 |
| 2009/0139739 A1 | | 6/2009 | Hansen | |
| 2009/0257882 A1 | * | 10/2009 | Olsen | ......................... 416/241 B |
| 2010/0329881 A1 | * | 12/2010 | Mendez Hernandez et al. | ............................. 416/230 |

FOREIGN PATENT DOCUMENTS

| | | |
|---|---|---|
| CN | 1479838 A | 3/2004 |
| CN | 1481602 A | 3/2004 |
| CN | 101336342 A | 12/2008 |
| CN | 101438055 A | 5/2009 |
| DE | 202006000673 U1 | 6/2006 |
| DE | 102005051537 A1 | 5/2007 |
| DE | 10 2006 044 323 A1 | 3/2008 |
| EP | 707145 A1 | 4/1996 |
| EP | 2 141 356 A1 | 1/2010 |
| EP | 2 157 316 A2 | 2/2010 |
| JP | 58216396 A | 12/1983 |
| JP | 2005113735 A | 4/2005 |
| JP | 2005302399 A | 10/2005 |
| JP | 2005318077 A | 11/2005 |
| JP | 2007046575 A | 2/2007 |
| JP | 2007100658 A | 4/2007 |
| JP | 2007-138755 A | 6/2007 |
| JP | 2007170268 A | 7/2007 |
| WO | 2005031158 A2 | 4/2005 |
| WO | 2007062659 A1 | 6/2007 |

OTHER PUBLICATIONS

Communication from the State Intellectual Property Office of P.R. China dated Oct. 10, 2014, in a counterpart application No. 201180008252.3.
Communication dated Mar. 25, 2015 issued by the European Patent Office in counterpart European Patent Application No. 11739848.7.
International Search Report dated Apr. 26, 2011 issued by the International Searching Authority in counterpart International Application No. PCT/JP2011/052299.
Written Opinion dated Apr. 26, 2011 issued by the International Searching Authority in counterpart International Application No. PCT/JP2011/052299.

* cited by examiner

*Primary Examiner* — Nathaniel Wiehe
*Assistant Examiner* — Eldon Brockman
(74) *Attorney, Agent, or Firm* — Sughrue Mion, PLLC (57) ABSTRACT

To effectively perform lightning protection in a blade for wind power generation and to prevent the blade from being damaged when arresting lightning. The lightning protection structure of the blade for wind power generation includes a conductive lightning receptor 1 attached to a part of the blade for wind power generation, and a ceramic member 10 interposed between at least surface-layer portions of the lightning receptor 1 and the blade 5. Therefore, an electric field is likely to concentrate at an interface between the ceramic member 10 having excellent heat resistance and the lightning receptor 1, so that it is possible to effectively prevent the blade 5 from being damaged due to a concentration of the electric field at the interface of the blade 5 attached with the lightning receptor 1 when arresting the lightning.

5 Claims, 6 Drawing Sheets

LIGHTNING PROTECTION STRUCTURE OF BLADE FOR WIND POWER GENERATION

TECHNICAL FIELD

The present invention relates to a lightning protection of a blade for wind power generation to prevent damage of the blade which is utilized for the wind power generation.

BACKGROUND ART

Blades for wind power generation currently used is mainly made of glass fiber reinforced plastics (GFRP), and the blade itself is an insulator and has no electrical conductivity. Accordingly, in an era when a small wind power generator was used, it was considered that the blade was not struck by lightning. However, as the wind power generator grows in size, damage of the blade struck by the lightning is increased. Accordingly, a method of attaching a member (e.g., lightning receptor) made of metal to the blade and connecting a lead line (e.g., down conductor) to the metallic member so as to lead the lightning to the ground has been generalized (for example, refer to Background-Art section of Patent Literature 1).

Various shapes or types of the lightning receptors have been proposed and put to practical use. For example, Patent Literature 2 proposes a lightning protection structure including a lightning rod protruding from a surface of a tip end of the blade. Patent Literature 3 proposes a lightning protection structure including a rod-shaped lighting receptor embedded in the tip end of the blade.

Figure 6:
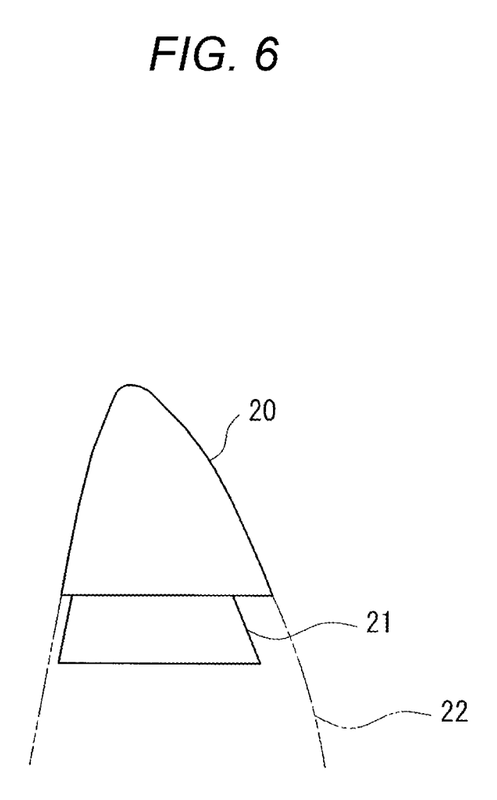
FIG. 6 is a perspective view illustrating a lightning protection structure according to the related art.

However, with the shapes of the lightning receptors proposed by Patent Literatures 2 and 3, a damage around the lightning receptor and of the lightning receptor itself due to lightning strike may not be restrained. For this reason, as shown in FIG. 6, there have been proposed a lightning protection structure in which a lightning receptor 20 made of metal, such as aluminum, is provided at a tip end portion of a blade 22 along the shape of the blade, and an anchor part 21, which is provided on the lightning receptor 20, is fixed to the blade 22. There have also been proposed a lightning protection structure in which a lightning receptor made of copper is installed on a portion near the widest width portion of the blade.

CITATION LIST

Patent Literature

Patent Literature 1: JP-A-2007-100658
Patent Literature 2: JP-A-2005-302399
Patent Literature 3: JP-A-2007-170268

SUMMARY OF INVENTION

Technical Problem

In the above-described proposed structures, however, since a joint portion between the lightning receptor and the blade is configured to have a corner portion (e.g., edge) in design, an electric field is likely to concentrate at the joint portion. For this reason, it is concerned that an interface between the blade and the metal is damaged by the lightning, and thus the lightning receptor may be detached from the blade. In addition, from the result of tests performed by the inventors, it has been confirmed that discharge is likely to concentrate at a boundary portion in the case of lightning stroke from a side.

The present invention has been made in view of the above-described circumstances, and an object of the present invention is to provide a lightning protection structure of a blade for wind power generation which can prevent an electric field from concentrating at a corner portion (e.g., edge) of the blade without deteriorating its lightning arresting performance, so as to prevent the blade from being damaged by the lightning.

Solution to Problem

That is, a lightning protection structure of a blade for wind power generation according to the present invention includes a conductive lightning receptor configured to be attached to a portion of the blade for wind power generation, and a ceramic member configured to be interposed between at least surface-layer portions of the lightning receptor and the blade.

In the lightning protection structure according to the present invention, a portion of the blade is provided with the conductive lightning receptor, and the lightning receptor is preferably attached to a tip end of the blade. However, in the present invention, the attached position of the lightning receptor is not limited. The lightning receptor may be attached to plural positions. For example, the lightning protection structure according to the present invention may be provided on the tip end and middle portion of the blade in a longitudinal direction of the blade.

The ceramic member is interposed between surface-layer portions of the lightning receptor and the blade, and it is preferable that the ceramic member is interposed between the surface-layer portion of the lightning receptor and the surface-layer portion of blade over its entire circumference.

With the interposition of the ceramic member, when the lightning receptor arrests the lightning, the electric field first concentrates at the tip end of the lightning receptor or the interface between the lightning receptor and the ceramic member. As a result, it is possible to prevent the blade from being damaged due to that the electric field concentrates at the interface of the blade. Since the ceramic member is excellent in heat resistance and electric insulation, it is hard to be damaged by the concentration of the electric field. Since the ceramic member is positioned over the entire circumference between the lightning receptor and the blade, it is possible to certainly prevent the electric field from concentrating at the interface of the blade.

The ceramic member may be interposed at least between the surface-layer portion of the lightning receptor and the surface-layer portion of blade, and a depth of the ceramic member interposed between the lightning receptor and the blade may be appropriately set.

When placing the ceramic member, it is preferable that a surface of the blade and a surface of the ceramic member are formed to be flush with each other. As a result, it is possible to avoid the concentration of the electric field at the interface between the blade and the ceramic member due to the lightning, and to obtain the excellent performance in view of aerodynamics. Further, a good aerodynamic characteristic is obtained by forming the surface of the ceramic member and the surface of the lightning receptor to be flush with each other, so that power generation performance is maintained very well.

The lightning receptor is made of material having electrical conductivity and is generally made of metal. Incidentally, the present invention does not deny use of material other than the metal. The metal material includes pure metal such as Al, Cu, Ti, or W, an alloy thereof, a composite material (e.g., different materials are mixed with or dispersed in a base material, or different kinds of materials are layered or mixed with each other), and so forth.

The ceramic member may include various ceramics. The present invention is not limited to a specific kind of ceramic member, and appropriate selection is possible. Preferably, for example, BN (boron nitride), alumina or the like can be used.

In addition, a material of the blade, to which the lightning receptor and the ceramic member are attached, is not limited to a specific material. The blade may be made of known materials.

The lightning receptor is attached to the tip end of the blade. At the tip end of the blade, the lightning receptor may have a tapered shape (tapered in a direction seeing the surface of the blade) continuing from the shape of the blade and its width is gradually reduced toward its tip end. According thereto, it is possible to improve the function of arresting the lightning while ensuring favorable aerodynamic characteristics.

In addition, in order to reliably attach the lightning receptor to the blade, the lightning receptor may be provided with an anchor part, and the anchor part may be fixed to the blade. The anchor part penetrates through a hollow portion of the ceramic member so as to reach and be positioned in the blade, so that the anchor receptor may be certainly fixed to the blade without having a bad effect on the function of the ceramic member. Specifically, by forming an insertion/penetration hole in the ceramic member and by inserting and penetrating the anchor part through the insertion/penetration hole, the ceramic member may be held by the blade and the anchor part fixed to the blade. In order to improve the holding effect, the insertion/penetration hole may be adapted to the shape of the anchor part, so that a lateral wall of the anchor part is in close contact with the insertion/penetration hole when the anchor part is inserted and penetrated through the insertion/penetration hole.

Further, fixing the anchor part to the blade may be carried out by engaging the anchor part with an engaging structure provided in the blade or by using an adhesive. Further, these methods may be combined to fix the anchor part to the blade.

Incidentally, in the following description, the tapered shape and the inverse tapered shape mean a shape in a direction seeing the surface of the blade.

DESCRIPTION OF EMBODIMENTS

Embodiments of the present invention will now be described with reference to the accompanying drawings.

Figure 1:
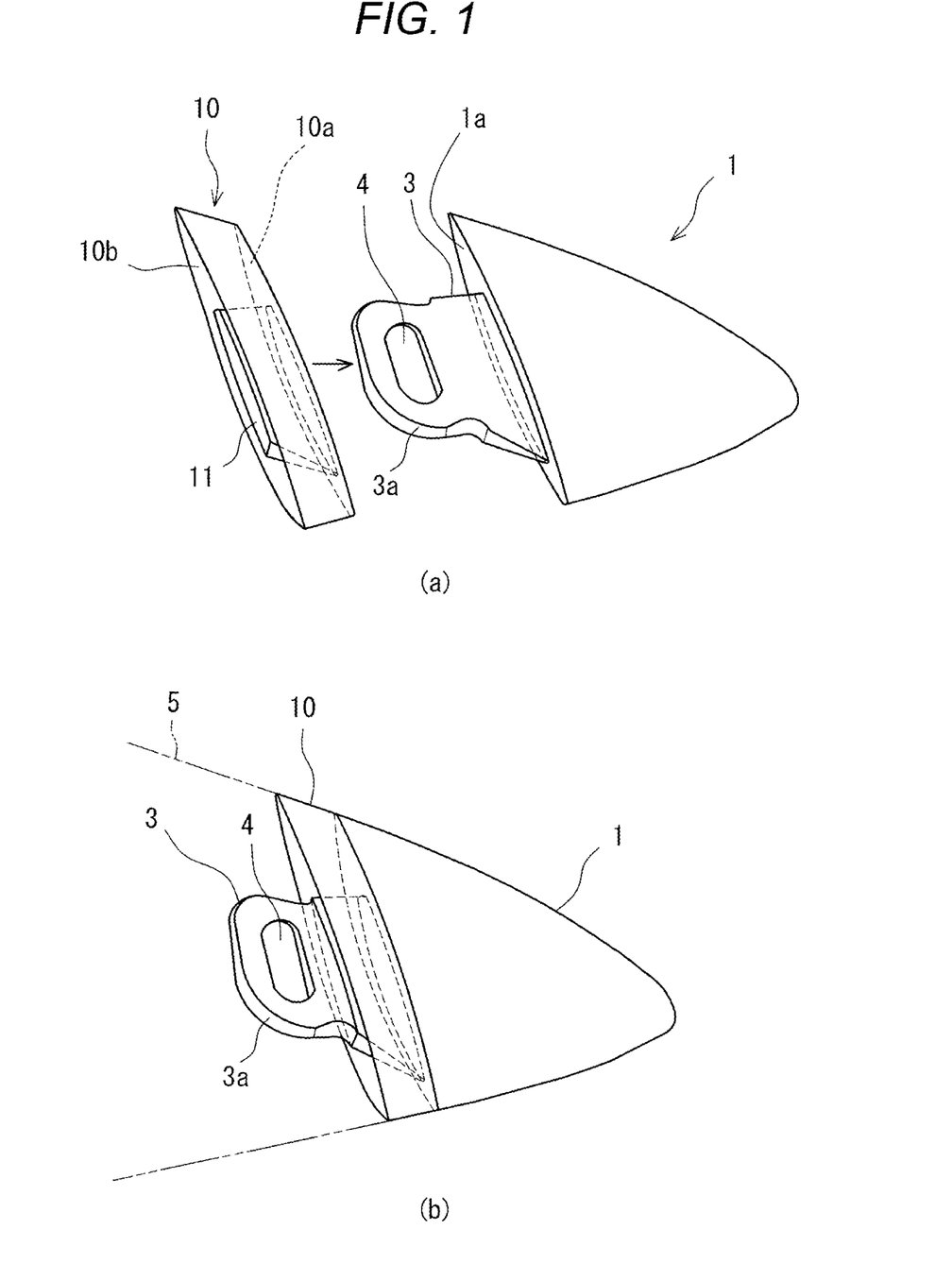
FIG. 1(a) is an exploded perspective view illustrating a lightning protection structure according to an embodiment of the invention.
FIG. 1(b) is a perspective view illustrating a state in which the lightning protection structure according to this embodiment is attached to a blade.

FIG. 1 illustrates a lightning receptor 1 made of aluminum alloy and a ceramic member 10 which are used in a lightning protection structure according to the present invention.

The lightning receptor 1 and the ceramic member 10 have a shape continuing to the blade 5 and are configured to be flush with the blade 5 when the lightning receptor 1 and the ceramic member 10 are respectively assembled to the blade 5.

The lightning receptor 1 has a flat shape and is tapered so that its width and thickness are decreased toward a tip end side. The tip end of the lightning receptor 1 has a curved shape of a small diameter.

The lightning receptor 1 has a flat end face 1a on a bottom surface thereof. The flat end face 1a intersects in a longitudinal direction of the lightning receptor 1 on a circumferential portion. The flat end face 1a is provided with a plate-shape anchor part 3 so that the anchor part 3 is received in the flat end face 1a, and the anchor part 3 protrudes from the flat end face 1a in the longitudinal direction of the lightning receptor 1. A tip end portion 3a of the plate-shape anchor part 3 has a tapered shape, with a width decreasing towards its tip end. The tip end of the tip end portion 3a has a curved shape. In addition, the anchor part 3 is provided at its tip end side with an introducing hole 4 for receiving an adhesive therein. The introducing hole 4 is formed to be extended in a widthwise direction.

The ceramic member 10 has a flat tube shape. The ceramic member 10 is provided with an anchor part insertion/penetration hole 11 into which the anchor part 3 is inserted. The ceramic member 10 is provided with a flat end face 10a, which surface contacts with the flat end face 1a, at one end thereof facing the lightning receptor 1 and a flat surface 10b which surface contacts with a cross end of the blade 5, at the other end thereof.

The anchor part insertion/penetration hole 11 of the ceramic member 10 is configured so that it is in close contact with an outer surface of the anchor part 3, without forming a gap therebetween, in a state in which the anchor part 3 is inserted into the anchor part insertion/penetration hole 11. As a result, it may be obtained an effect such that the ceramic member 10 is held by the anchor part 3.

When the ceramic member 10 is assembled to the lightning receptor 1, the anchor part 3 is inserted into the anchor part insertion/penetration hole 11 so that the flat surface 10a of the ceramic member 10 comes in contact with the flat end face 1a of the lightning receptor 1. Incidentally, an adhesive may be used to bond the flat surface 10a and the flat end face 1a in this instance.

The flat surface 10b of the ceramic member 10 comes in contact with the end face of the blade 5. In addition, the tip end side of the anchor 3 is positioned in the blade 5 side through the insertion/penetration hole 11, and the tip end side of the anchor 3 is adhered to the inside of the blade 5 by using an adhesive. In this instance, the adhesive flows in the introducing hole 4 so as to increase adhesive strength.

Incidentally, the blade 5 may be provided with an engaging void (not illustrated) with which the tip end portion 3a is engaged, and the tip end portion 3a may be engaged with the engaging void and simultaneously be adhered to the engaging void by using the adhesive. When a planar shape of the engaging hole is formed in a tapered shape of which a width is gradually reduced toward its tip end side, the engaging hole can certainly fix the anchor part 3 to the blade in cooperation with an inverse tapered shape of the tip end portion 3a.

With the adhesion, the blade 5, the ceramic member 10 and the lightning receptor 1 are connected to each other from an outer surface of the blade 5 through an outer surface of the ceramic member 10 to an outer surface of the lightning receptor 1, so that an outer surface which is flush with each joint portion is obtained. Accordingly, the outer shapes of the ceramic member 10 and the lightning receptor 1 are determined so as to obtain the above outer surface.

Figure 2:
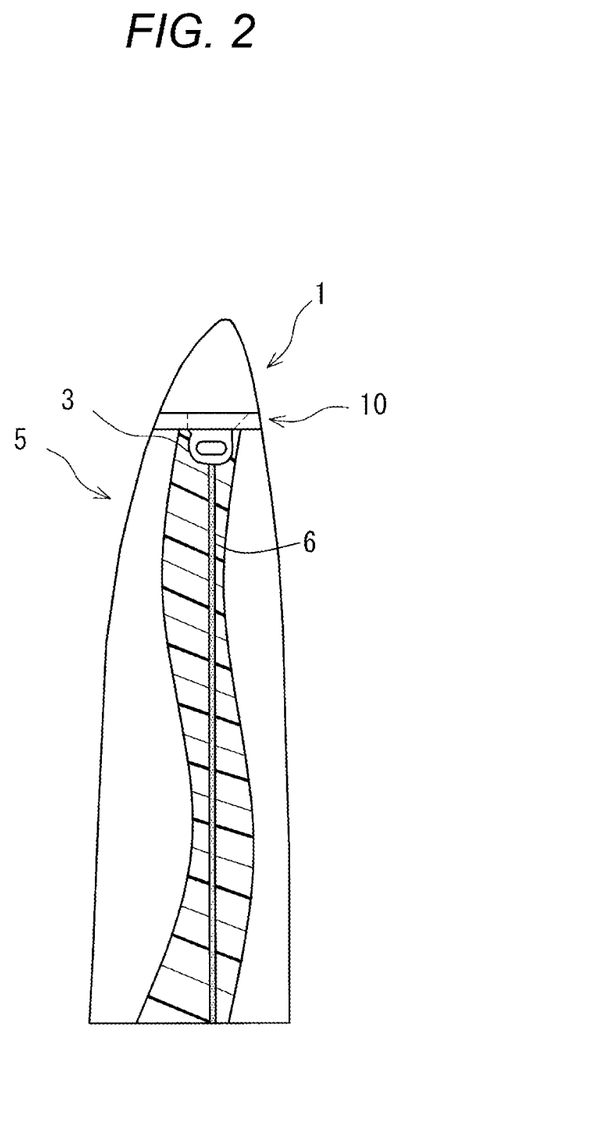
FIG. 2 is a partially cutaway plan view of the blade, to which the lightning protection structure shown in FIGS. 1(a) and 1(b) is attached, showing an inside of the blade.

Incidentally, the blade 5 may be configured by joining segment blades which are divided in a thickness direction, and the lightning receptor 1 and the ceramic member 10 may be fixed to the blade 5 at the time of the joining. By using the segment blades which are divided in the thickness direction, it is possible to easily fix the anchor part 3. Specifically, by utilizing the segment blades, it becomes easy to carry out the fixing work when engaging the inverse tapered shape of the tip end portion 3a of the anchor part 3 and the tapered shape of the blade 5 with each other. A ground line 6 is electrically connected to the anchor part 3, as illustrated in FIG. 2, and an end portion of the ground line 6 is grounded.

The lightning receptor 1 and the ceramic member 10 may be attached to the respective blades of the wind power generator.

With the lightning protection structure, the lightning is effectively arrested by the lightning receptor, and it is possible to prevent the blade from being struck by the lightning. Further, an electric field does not concentrate at the blade side provided with the lightning protection structure, and it is possible to allow the electric field to concentrate at an interface or the like between the lightning receptor and the ceramic member. Since the ceramic member has a heat resistance or the like, it is hardly damaged by the concentration of the electric field. As a result, the blade having a high thunderbolt resistance for wind power generation can be provided.

Figure 3:
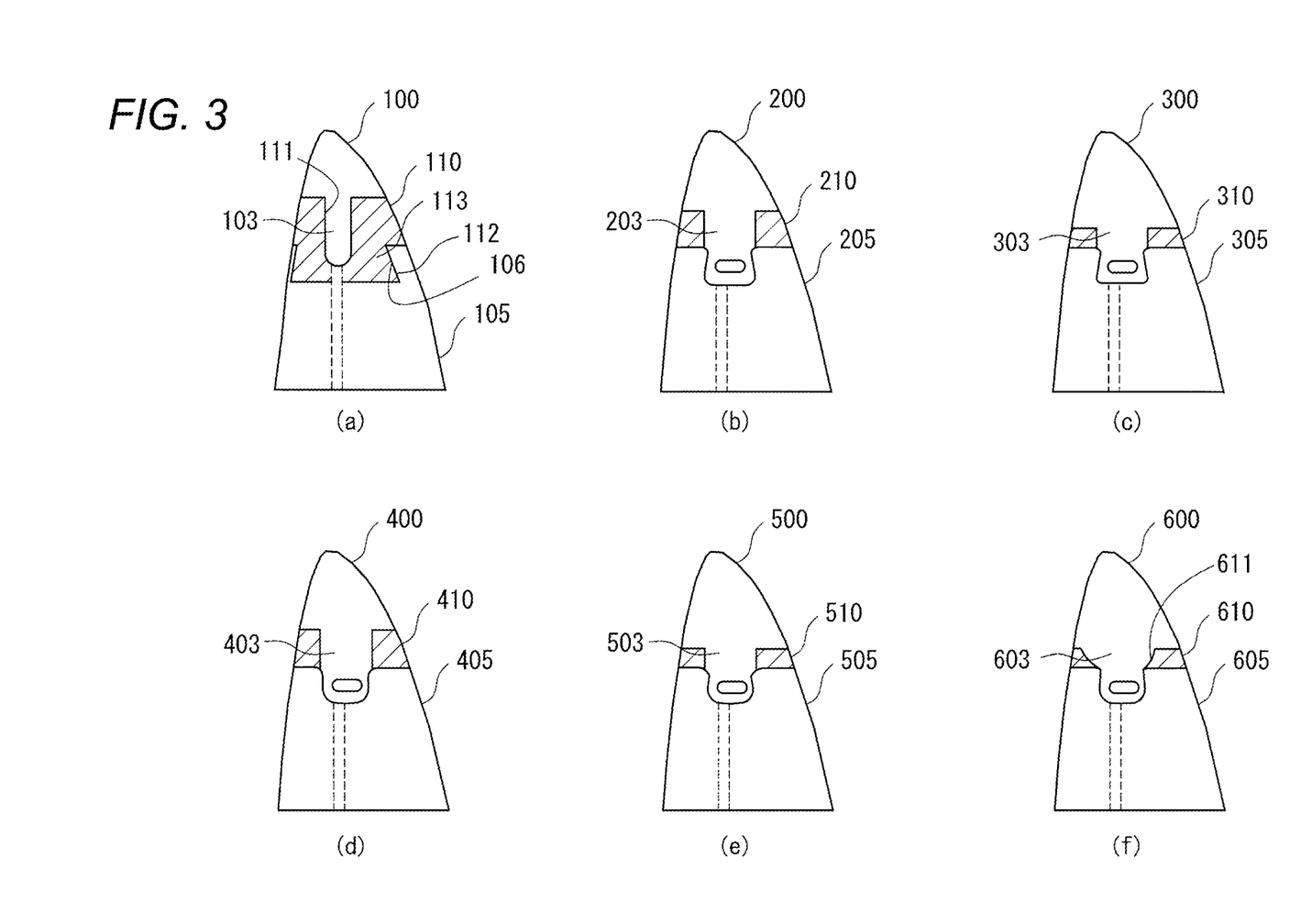
FIGS. 3(a) to 3(f) are diagrams illustrating a lightning protection structure according to a modified embodiment of the present invention.

Next, a lightning protection structure according to another embodiment will be described on the basis of FIG. 3.

FIG. 3(a) illustrates an example in which an anchor part 103 provided on a lightning receptor 100 has an elongated width and a length shorter than a thickness of a ceramic member 110. The anchor part 103 is inserted into an anchor part insertion/penetration hole 111 formed in the ceramic member 110 and is then fixed thereto by using an adhesive or the like.

The ceramic member 110 is formed to have a solid section except for the anchor part insertion/penetration hole 111. The ceramic member 110 is provided on a portion to be joined to the blade with a tapered portion 112 having a width which is narrower than that of the blade 105 and is gradually increased toward a base end of the blade 105. Meanwhile, the blade 105 is provided with a tapered groove portion 106 of an inverse tapered shape, of which a width is gradually reduced toward the tip end side, so as to engage with the tapered portion 112. By engaging and fixing the tapered portion 112 and the tapered groove portion 106 by using the adhesive or the like, the ceramic member 110 can be firmly adhered to the blade 105. Further, no electric field concentrates at a corner portion of the tapered portion 112 having electric insulation.

FIG. 3(b) illustrates an example in which a ceramic member 210 has a thick thickness, and in accordance therewith, an anchor part 203 of a lightning receptor 200 has a long length. Thus, even though the ceramic member 210 is thickened, a tip end side of the anchor part 203 can be positioned in a blade 205.

In addition, since the thickness of the ceramic member 210 is increased, a distance between an end face of the lightning receptor 200 and an end face of the blade 205 is increased. Therefore, when the lightning receptor 200 arrests the lightning, the end face of the blade 205 can be prevented from being influenced by the lightning. Incidentally, in this example, the tip end of the anchor part 203 is formed in a straight shape.

FIG. 3(c) illustrates an example in which a ceramic member 310 has a thin thickness as compared with those illustrated in FIG. 3(b), and in accordance therewith, an anchor part 303 of a lightning receptor 300 has a short length. A tip end side of the anchor part 303 is positioned in a blade 305.

FIG. 3(d) illustrates an example in which a ceramic member 410 has almost same thickness as that of the ceramic member illustrated in FIG. 3(b), and an anchor part 403 provided on a lightning receptor 400 has a length corresponding to the thickness of the ceramic member 410. In this example, a tip end side of the anchor part 403 positioned in a blade 405 is formed in a curved shape.

FIG. 3(e) illustrates an example in which a ceramic member 510 has a thin thickness as compared with those illustrated in FIG. 3(d), and in accordance therewith, an anchor part 503 of a lightning receptor 500 has a short length. A tip end side of the anchor part 503 is positioned in a blade 505.

In FIG. 3(f), a base side of an anchor part 603 provided on the lightning receptor 600 is formed in a tapered shape of which a width is increased toward a tip end side, when seen at a surface of a blade 5, and a side edge of the tapered portion is formed in a curved shape. Meanwhile, an anchor part insertion/penetration hole 611 formed in a ceramic member 610 is formed so that its width is gradually reduced toward the blade side. As a result, an area of a contact surface between the base side of the anchor part 603 and the anchor part insertion/penetration hole 611 of the ceramic member 610 is increased. Further, it is possible to press the ceramic member 610 toward the blade 605 side by fixing the anchor part 603 to the blade 605. According thereto, the ceramic member 610 can be firmly held.

Incidentally, it has been described in this embodiment that the lightning protection structure including the lightning receptor and the ceramic member is provided to the tip end portion of the blade. However, a position to be provided with the lightning protection structure is not limited thereto so long as the lightning protection structure is provided to a portion of the blade.

The present invention has been described on the basis of this embodiment, but the present invention is not limited to the contents of the above embodiment, and can be properly modified within the scope of the invention.

Embodiment 1

Next, the lightning protection structure including the lightning receptor 1 made of aluminum and the ceramic member 10 according to the embodiment of the present invention illustrated in FIG. 1 and a lightning protection structure including a lightning receptor 20, with no ceramic member is interposed, according to the related art illustrated in FIG. 6 were attached to an FRP material imitated as a blade. Then, those lightning protection structures were subjected to 2-D electric field analysis using simulation to predict a position struck by the lightning.

Incidentally, in the analysis, an analysis software MARC2007R1 (a product manufactured by MSC Software Corporation) was utilized, and a point charge was placed at a distance of 1 m from the tip end portion of the blade. Letting a position immediately above the tip end portion of the blade to be 0°, point charges were placed at positions of ±30°, ±60°, and ±90°, and positions of 200 mm and 500 mm lowered immediately below the position of ±90° to perform the analysis. At that time, the end portion of the down conductor was set to be a fixed potential.

Figure 4:
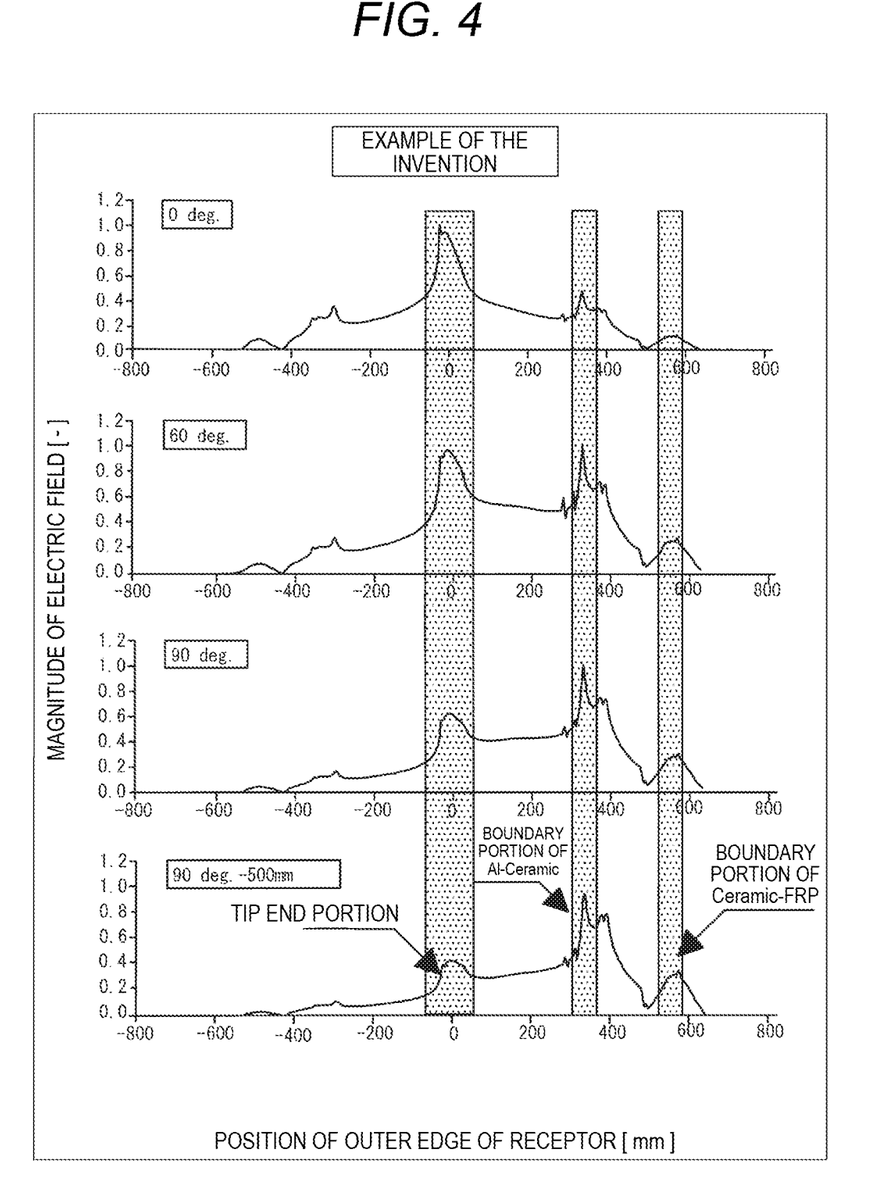
FIG. 4 is a graph illustrating an electric field analyzing result of an example of the present invention in the embodiment.
Figure 5:
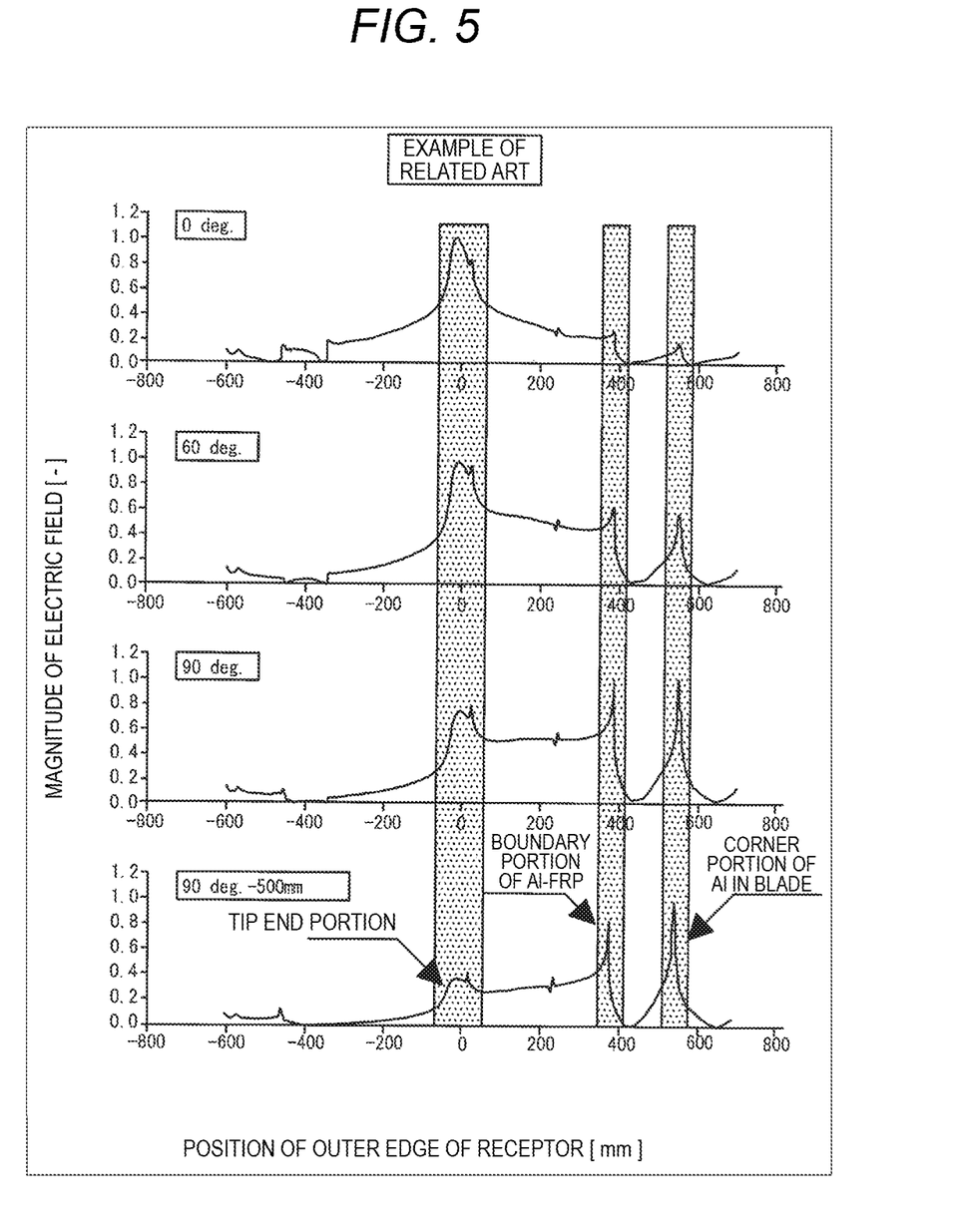
FIG. 5 is a graph illustrating an electric field analyzing result of an example of a related art in the embodiment.

The analysis result of the embodiment of the present invention is shown in FIG. 4, while the analysis result of the related art is shown in FIG. 5. As would be apparent from FIG. 4, in the embodiment of the present invention, the electric field concentrates at the interface between the lightning receptor and the ceramic member, in addition to the tip end portion of the lightning receptor, whereas the electric field hardly concentrates at the interface between an equivalent material of the blade and the ceramic member. In contrast, as would be apparent from FIG. 5, in the embodiment of the related art, the electric field concentrates at the boundary portion between the lightning receptor and the equivalent material of the blade, in addition to the tip end portion of the lightning receptor, and also concentrates at the corner portions of the lightning receptor in the equivalent material of the blade. Thus, in the related art, even if the lightning receptor is provided for the windmill, the blade may possibly be damaged by the lightning.

The present invention is not limited to the above-described embodiments, and appropriate variations, modifications, or the like may be made. In addition, materials, shapes, dimensions, forms, number, placed positions, or the like of the respective constitutional elements is arbitrary and is not limited thereto, if those can achieve the present invention.

Although the present invention has been described in detail with reference to specific embodiments, those skilled in the art will appreciate that various modifications or variations are possible, without departing from the scope and spirit of the invention.

This application claims priority to Japanese Patent Application No. 2010-023504 filed on Feb. 4, 2010, and the entire disclosure thereof is hereby incorporated herein by reference.

INDUSTRIAL APPLICATION

As described above, with the lightning protection structure of the blade for wind power generation according to the present invention, since the conductive lightning receptor is attached to a portion of the blade for wind power generation, and the ceramic member is interposed between at least surface-layer portions of the lightning receptor and the blade. Therefore, it is possible to effectively prevent the blade from being damaged due to that the electric field concentrates at the interface between the blade and the lightning reception attached to the blade.

REFERENCE SINGS LIST 1 lightning receptor
3 anchor part
5 blade
6 ground line
10 ceramic member
11 anchor part insertion/penetration hole

The invention claimed is:

1. A lightning protection structure of a blade for wind power generation, comprising:
    a conductive lightning receptor configured to be attached to a portion of the blade for wind power generation, the lightning receptor provided with an anchor part protruding from a flat end face of the lightning receptor and in a longitudinal direction of the blade; and
    a ceramic member configured to be interposed between at least surface-layer portions of the lightning receptor and the blade, the ceramic member having a flat tube shape, an outer perimeter surface of the tube shape flush with an outer perimeter of the lightning receptor and an outer perimeter of the blade,
    wherein the anchor part is disposed inside an interior portion of the tube shape of the ceramic member.

2. The lightning protection structure of the blade for wind power generation according to claim 1,
    wherein the lightning receptor is provided on a tip end of the blade.

3. The lightning protection structure of the blade for wind power generation claim 1,
    wherein the ceramic member is interposed between the surface-layer portion of the lightning receptor and the surface-layer portion of blade over an entire circumference of the surface-layer portions.

4. The lightning protection structure of the blade for wind power generation according to claim 3,
    wherein the lightning receptor has a tapered shape continuing from the shape of the blade and a width thereof is gradually reduced toward a tip end thereof.

5. The lightning protection structure of the blade for wind power generation according to claim 1,
    wherein the anchor part is engaged with an engaging structure of the blade.

\* \* \* \* \*